(12) United States Patent
Lee et al.

(10) Patent No.: US 10,868,700 B2
(45) Date of Patent: Dec. 15, 2020

(54) METHOD AND APPARATUS THEREFOR FOR DETECTING DATA TRANSMITTED ACCORDING TO MULTIUSER SUPERPOSITION TRANSMISSION SYSTEM

(71) Applicant: LG ELECTRONICS INC., Seoul (KR)

(72) Inventors: Hojae Lee, Seoul (KR); Sangrim Lee, Seoul (KR); Kwangseok Noh, Seoul (KR); Dongkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 16/320,834

(22) PCT Filed: Jul. 27, 2016

(86) PCT No.: PCT/KR2016/008204
§ 371 (c)(1),
(2) Date: Jan. 25, 2019

(87) PCT Pub. No.: WO2018/021592
PCT Pub. Date: Feb. 1, 2018

(65) Prior Publication Data
US 2019/0165972 A1 May 30, 2019

(51) Int. Cl.
*H04L 25/03* (2006.01)
*H04L 25/02* (2006.01)
*H04J 11/00* (2006.01)

(52) U.S. Cl.
CPC ........ *H04L 25/0398* (2013.01); *H04J 11/004* (2013.01); *H04L 25/02* (2013.01);
(Continued)

(58) Field of Classification Search
CPC .............. H04L 25/0398; H04L 25/023; H04L 2025/03426; H04L 25/03; H04L 25/02;
(Continued)

(56) References Cited

U.S. PATENT DOCUMENTS

| | | | | |
|---|---|---|---|---|
| 2015/0043540 | A1* | 2/2015 | Nikopour | H04W 72/048 370/335 |
| 2018/0083746 | A1* | 3/2018 | Kang | H04L 5/0007 |
| 2018/0302134 | A1* | 10/2018 | Kang | H04W 72/0473 |

FOREIGN PATENT DOCUMENTS

| | | |
|---|---|---|
| KR | 10-2015-0070973 A | 6/2015 |
| WO | 2015/065113 A1 | 5/2015 |
| WO | 2016/114631 A1 | 7/2016 |

OTHER PUBLICATIONS

Lim, et al.: "Design of SCMA Encoders to Achieve Low Bit Error Rate", The Korean Institute of Communication and Information Services (KIDS), Summer Conference, Jun. 22, 2016, p. 56.

* cited by examiner

*Primary Examiner* — Faisal Choudhury
(74) *Attorney, Agent, or Firm* — Dentons US LLP (57) ABSTRACT

A method for a terminal for detecting data transmitted according to the multiuser superposition transmission system comprises the steps of: receiving, from a base station, downlink control information comprising information for a codeword subset selected form a non-orthogonal codebook comprising an orthogonal subset and non-orthogonal subset; estimating a channel on the basis of a reference signal symbol or reference signal pattern corresponding to the selected codebook subset; and, on the basis of the channel estimation, detecting desired data symbols on the basis of the selected codebook subset, wherein the superposed data symbols are symbols comprising data not only for the terminal but also for other terminals.

14 Claims, 8 Drawing Sheets

(52) U.S. Cl.
CPC ............ *H04L 25/023* (2013.01); *H04L 25/03* (2013.01); *H04L 25/03006* (2013.01); *H04L 25/03942* (2013.01); *H04L 2025/03426* (2013.01)

(58) Field of Classification Search
CPC .......... H04L 25/03006; H04L 25/03942; H04J 11/004
USPC ........................................................ 370/329
See application file for complete search history.

METHOD AND APPARATUS THEREFOR FOR DETECTING DATA TRANSMITTED ACCORDING TO MULTIUSER SUPERPOSITION TRANSMISSION SYSTEM

This application is a National Stage Application of International Application No. PCT/KR2016/008204, filed on Jul. 27, 2016, which is hereby incorporated by reference in its entirety for all purposes as if fully set forth herein.

TECHNICAL FIELD

The present invention relates to wireless communication, and more particularly, to a method of detecting data transmitted according to a multiuser superposition transmission scheme and an apparatus therefor.

BACKGROUND ART

3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms. Also, the future 5G technology requires more massive UE connectivity for one base station, and it is expected that 5G requirement connectivity will be increased to maximum 1,000,000/km2.

DISCLOSURE OF THE INVENTION

Technical Tasks

A technical task of the present invention is to provide a method for a user equipment to detect data transmitted according to a multiuser superposition transmission scheme. Another technical task of the present invention is to provide a user equipment for detecting data transmitted according to a multiuser superposition transmission scheme.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of detecting a transmitted data by a user equipment (UE) according to a multiuser superposition transmission scheme, includes the steps of receiving downlink control information including information regarding a codebook subset selected from a non-orthogonal codebook including an orthogonal subset and a non-orthogonal subset, from a base station, performing channel estimation based on a reference signal symbol or reference signal pattern corresponding to the selected codebook subset, and detecting desired data symbols based on the selected codebook subset and the channel estimation. In this case, the superposed data symbols may correspond to symbols including data not only for the UE but also for other UEs. The information on the selected codebook subset may include a codebook subset index corresponding to the selected codebook subset. The interference cancellation scheme may correspond to a scheme for cancelling interference between the multiusers.

When the selected codebook subset is configured by codewords of which an overloading factor is equal to or less than 1, the desired data symbols are detected based on an interference cancellation scheme performed on the received superposed data symbols and the overloading factor corresponds to a superposition factor/spreading factor.

When the selected codebook subset is configured by codewords of which an overloading factor is greater than 1, the desired data symbols are detected based on a multiuser detection scheme performed on the received superposed data symbols and the overloading factor corresponds to a superposition factor/spreading factor.

The method may further include equalizing the superposed data symbols which are received based on the channel estimation. In this case, the desired data symbols can be detected based on the selected codebook subset for the equalized superposed data symbols.

The desired data symbols may be detected based on a UE-specific spreading code allocated to the UE. The selected codebook subset can be selected based on a downlink traffic amount or an interference amount.

To further achieve these and other advantages and in accordance with the purpose of the present invention, according to a different embodiment, a user equipment (UE) for detecting a transmitted data according to a multiuser superposition transmission scheme includes a receiver configured to receive downlink control information including information regarding a codebook subset selected from a non-orthogonal codebook including an orthogonal subset and a non-orthogonal subset, from a base station and a processor configured to perform channel estimation based on a reference signal symbol or reference signal pattern corresponding to the selected codebook subset, the processor configured to detect desired data symbols based on the selected codebook subset and the channel estimation. In this case, the superposed data symbols may correspond to symbols including data not only for the UE but also for other UEs.

When the selected codebook subset is configured by codewords of which an overloading factor is equal to or less than 1, the processor is configured to detect the desired data symbols based on an interference cancellation scheme performed on the received superposed data symbols and the overloading factor corresponds to a superposition factor/spreading factor.

When the selected codebook subset is configured by codewords of which an overloading factor is greater than 1, the processor is configured to detect the desired data symbols based on a multiuser detection scheme performed on the received superposed data symbols and the overloading factor corresponds to a superposition factor/spreading factor.

The processor is configured to equalize the superposed data symbols, which are received based on the channel estimation, and detect the desired data symbols based on the selected codebook subset for the equalized superposed data symbols. The processor may be configured to detect the desired data symbols based on a UE-specific spreading code allocated to the UE. The selected codebook subset may be selected based on a downlink traffic amount or an interference amount.

Advantageous Effects

According to one embodiment of the present invention, when a plurality of symbols are transmitted through superposition via a non-orthogonal codebook based spreading scheme, a receiving end can efficiently detect a desired symbol from a plurality of the symbols.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs O1-DMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

When wireless transmission is performed between a base station and a user equipment, a transmission from the base station to the user equipment and a transmission from the user equipment to the base station are referred to as a downlink transmission and an uplink transmission, respectively. A technique of distinguishing a radio resource between the downlink transmission and the uplink transmission is defined as duplex. When a frequency band is divided into a downlink transmission band and an uplink transmission band and transmission and reception are bi-directionally performed, it is represented as frequency division duplex (FDD). It is apparent that a technique proposed in the present invention operates not only in the frequency division duplex but also in time division duplex (TDD) and full duplex. In TDD, a time resource is divided into downlink transmission time and uplink transmission time and transmission and reception are bi-directionally performed. In full duplex, transmission and reception are bi-directionally performed by sharing a time resource and a frequency resource.

Figure 1:
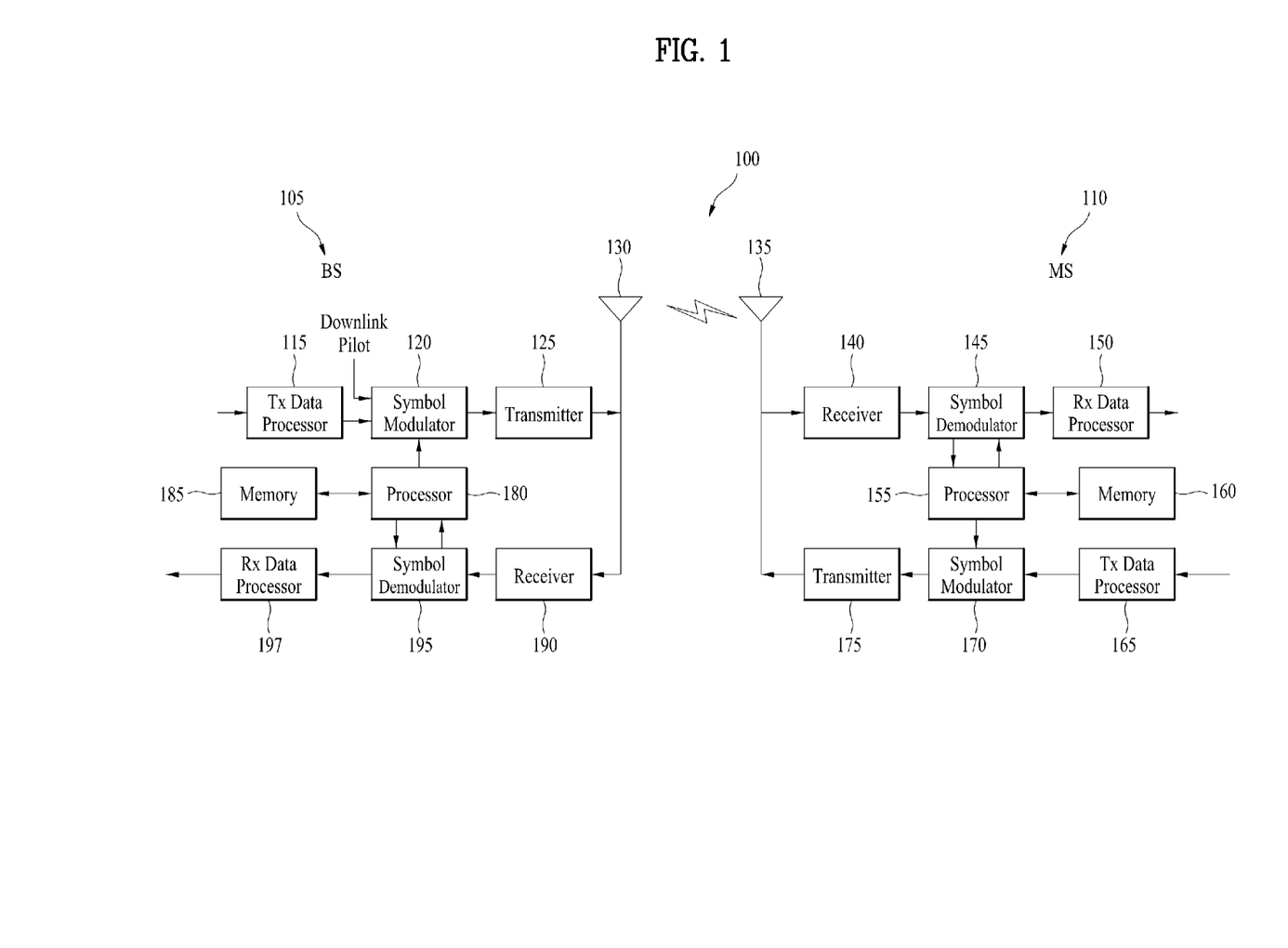
FIG. 1 is a block diagram illustrating configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes a non-orthogonal codebook based multi-user superposition access transmission scheme and an orthogonal codebook based multi-user superposition access transmission scheme.

Figure 2:
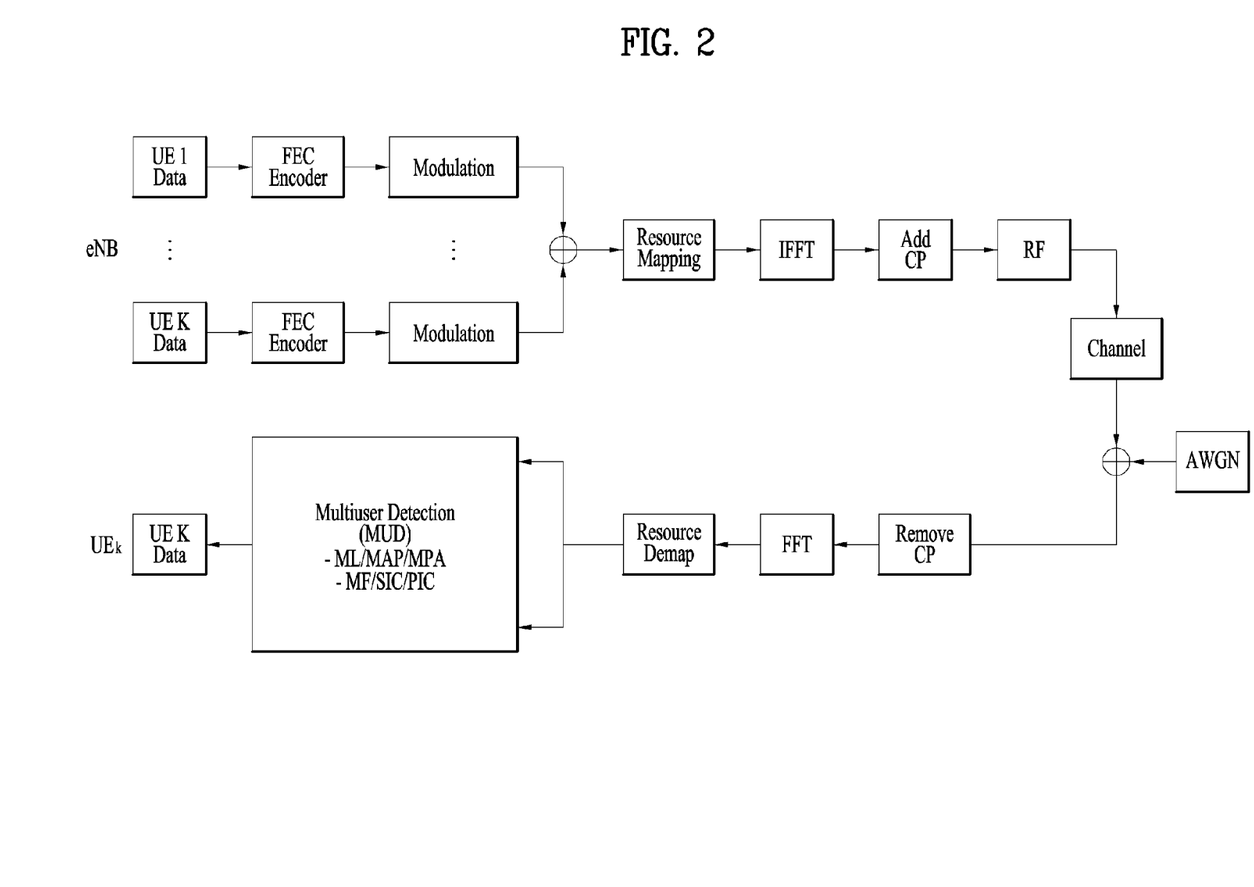
FIG. 2 is a block diagram illustrating NOMA based downlink transmission/reception (Tx/Rx) of a communication apparatus.

FIG. 2 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 2 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 2 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 2 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 2 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 3:
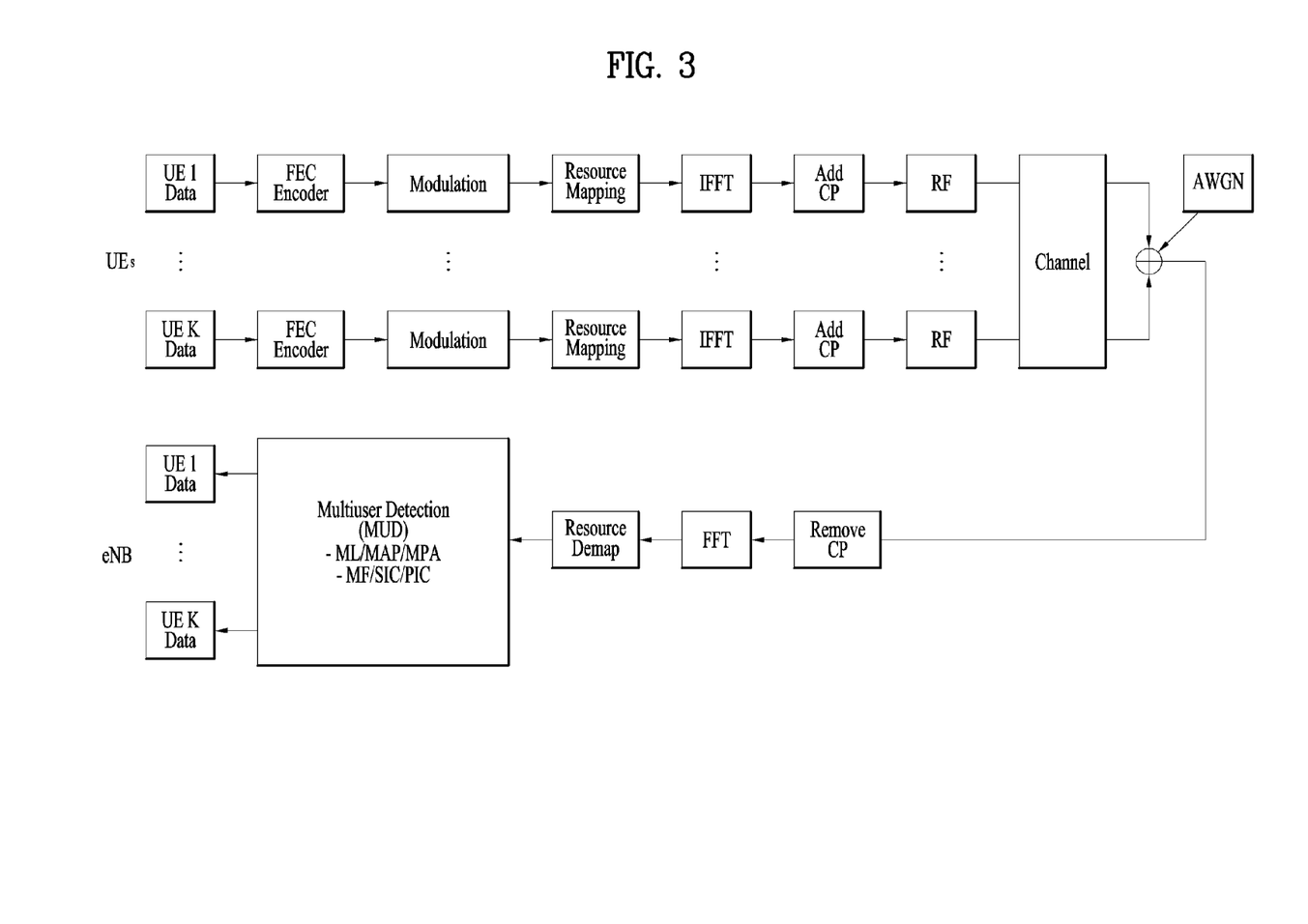
FIG. 3 is a block diagram illustrating NOMA based uplink transmission/reception (Tx/Rx) of a communication apparatus.

FIG. 3 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 3. Each system may transmit multi-UE data in the same manner as the description of the downlink structure of FIG. 2 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 2 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{MUI + \text{Noise}}\right), \forall k$$

In transmission capacity of the above Equation 2, the number of $R_k$ added in accordance with increase of K may be increased, whereby increase of C may be expected. However, each $R_k$ may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE.

Figure 4:
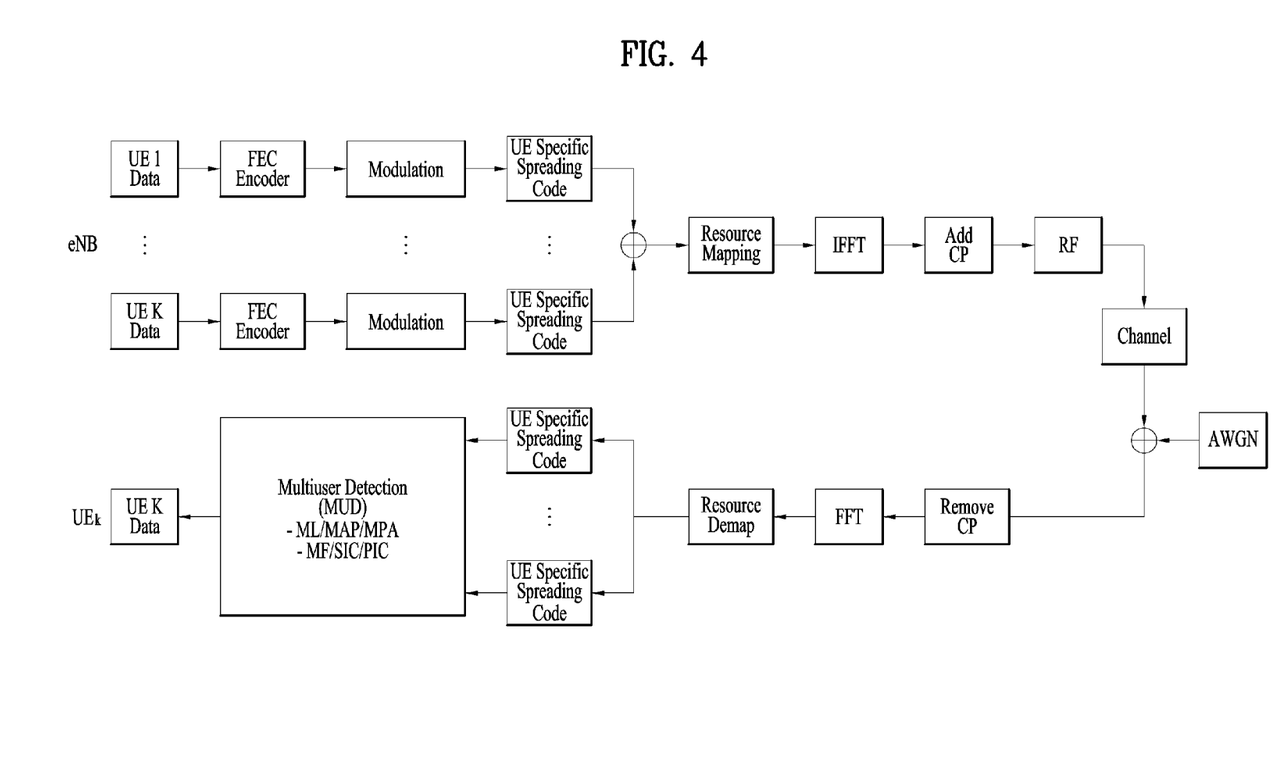
FIG. 4 is a block diagram illustrating NOMA and non-orthogonal spreading code based downlink transmission/reception (Tx/Rx) of a communication apparatus.
Figure 5:
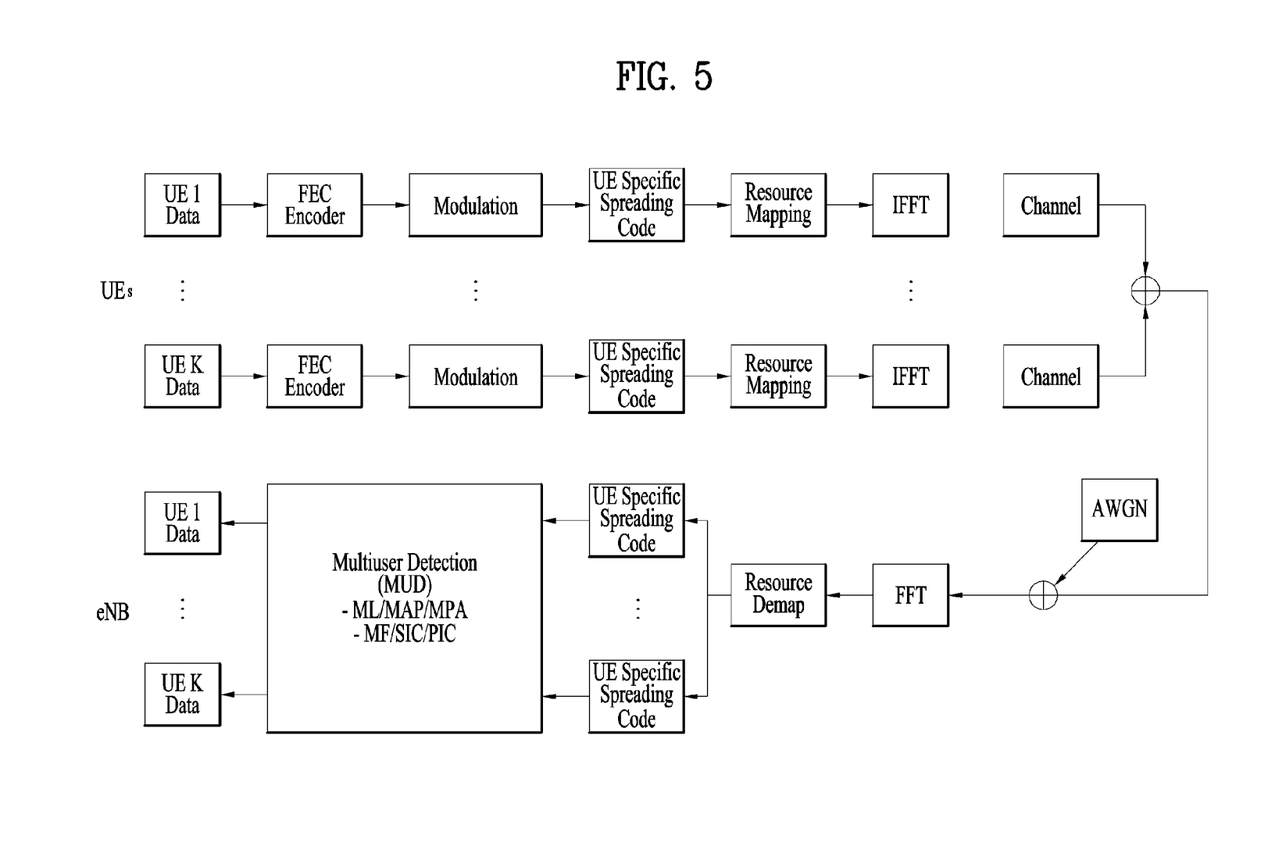
FIG. 5 is a block diagram illustrating NOMA and non-orthogonal spreading code based uplink transmission/reception (Tx/Rx) of a communication apparatus.

FIG. 4 is a block diagram illustrating NCMA based downlink transmission/reception (Tx/Rx) of a communication apparatus, and FIG. 5 is a block diagram illustrating NCMA based uplink transmission/reception (Tx/Rx) of a communication apparatus.

Among the NOMA techniques, when multi-user data are transmitted to the same time-frequency resource through superposition via a spreading scheme, an orthogonal codebook based type (e.g., SCMA, CDMA, etc.) assumes a multiple access scheme that uses a non-orthogonal spreading code. FIGS. 4 and 5 illustrate a downlink transmitting/receiving end structure and an uplink transmitting/receiving end structure of a NOMA system that transmits multiple user information through superposition using a UE-specific spreading code, when the multiple user information is assigned to the same time-frequency resource. In FIGS. 4 and 5, although the UE-spreading code is used in a time axis, the UE-spreading code can be used in a time axis as well.

A transmitting end/receiving end allocates a UE-specific spreading code to each user using a predefined codebook. The UE-specific spreading code can be expressed by an equation 3 described in the following.

$$C = [\, c^{(1)} \; \ldots \; c^{(K)} \,] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

A UE-specific spreading codebook corresponds to a codebook satisfying $C \subset \mathbb{C}^{N \times K}$ and has characteristics described in equation 4 in the following.

$$\begin{cases} |c^{(k)*} \cdot c^{(k)}| = 1, \; \forall k, k = 1, \ldots, K, \\ |c^{(k)*} \cdot c^{(j)}| = \delta_{kj}, \; \forall k, \forall j, k \neq j, k = 1, \ldots, K, j = 1, \ldots, K, \end{cases} \quad \text{[Equation 4]}$$

Figure 6:
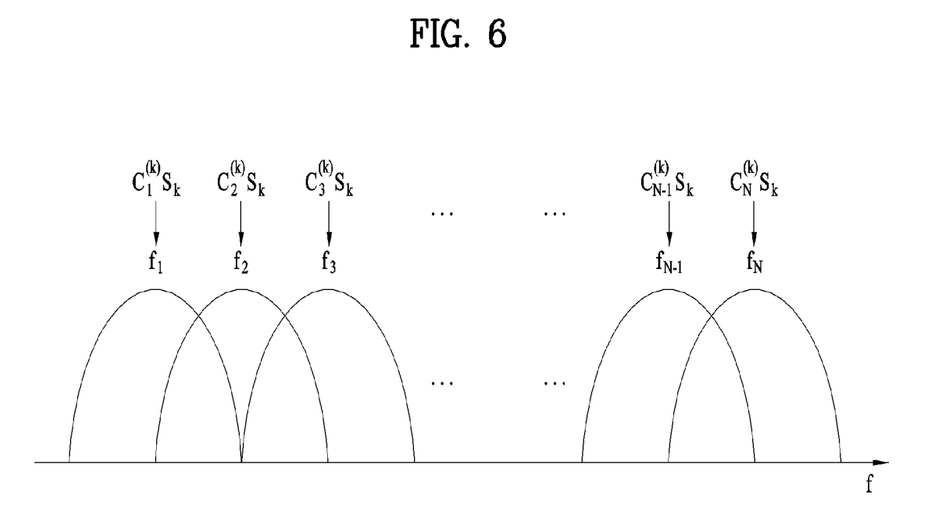
FIG. 6 is a conceptual diagram illustrating a frequency axis of a data transmission transmitted by a UE-specific spreading code.

FIG. 6 is a conceptual diagram illustrating a frequency axis of a data transmission transmitted by a UE-specific spreading code.

FIG. 6 illustrates a concept of transmitting data of a $k^{th}$ user transmitted by a transmitting end on a frequency axis through a UE-specific spreading code. When a codebook is promised between a transmitting end and a receiving end, data for the $k^{th}$ user is transmitted by multiplying the codeword by the data. In this case, a data symbol $s_k$ corresponds to a codeword vector $c^{(k)}$ of (N×1) dimension. Then, the N number of elements of the codeword corresponds to the N number of subcarriers. In particular, since a data symbol is transmitted through the N number of subcarriers in FIG. 6, efficiency of the same time-frequency resource is reduced to 1/N compared to a legacy LTE system. On the contrary, when symbols equal to or greater than the N number of symbols are transmitted through superposition, time-frequency resource efficiency increases compared to the LTE system. For example, when N<k, if the K number of symbols are transmitted through superposition, a frequency resource efficiency increases as much as K/N times.

Figure 7:
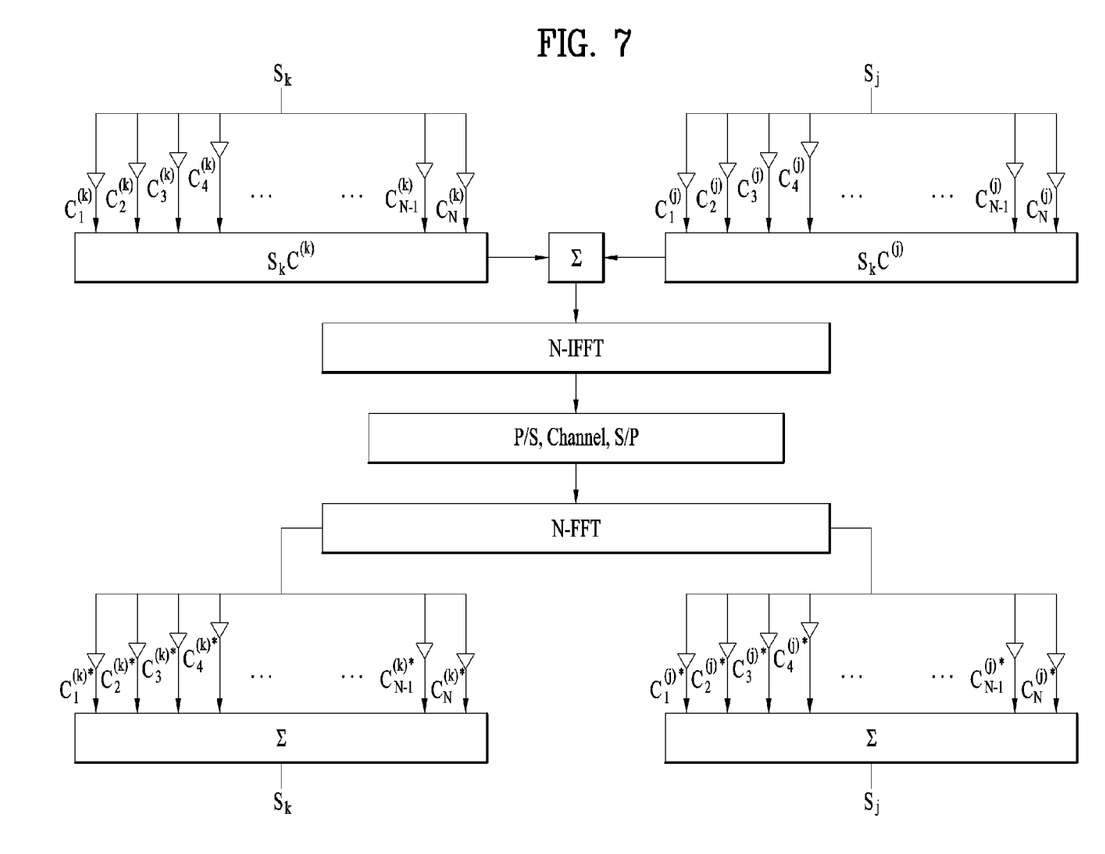
FIG. 7 is a diagram illustrating a basic transmission/reception structure of a non-orthogonal spreading code based NOMA system.

FIG. 7 is a diagram illustrating a basic transmission/reception structure of a non-orthogonal spreading code based NOMA system.

FIG. 7 is a diagram illustrating a basic transmission/reception structure of a NOMA system using a non-orthogonal spreading code. A transmitting end converts a data symbol for a user into a UE-specific spreading code corresponding to the user and the UE-specific spreading code is overlapped. OFDM transmission is performed in a manner that a frequency axis signal having a length of N is converted into a time axis signal through N-IFFT and a receiving end restores the frequency axis signal through N-FFT. The restored frequency axis signal decodes a data symbol of a user using a conjugate codeword of a UE-specific spreading code corresponding to the user. The decoded $s_k$ may include MUI depending on the number of overlapped users. The $s_k$ can be precisely decoded via a MUD scheme or the like. In this case, a length of the converted frequency axis signal can be shorter than N depending on a predefined UE-specific spreading code. For example, when a length of N is formed by connecting two frequency axis signal vectors, which are converted via a UE-specific spreading code of a length of N/2, in series, it is apparent that a receiving end is able to perform demodulation despite of N-FFT.

In downlink, a detection equation for decoding data to be decoded by a receiving end of a $k^{th}$ user can be expressed as equation 5 described in the following.

$$y_k = \sum_{n=1}^{K} H_k c^{(n)} s_n + n_k, \quad \text{[Equation 5]}$$

$$\hat{y}_k = \left[ \frac{[y_k]_j}{[H_k]_{j,j}} \right]_{j=1,\ldots,N} = \sum_{n=1}^{K} c^{(n)} s_n + \hat{n}_k,$$

In equation 5, $H_k$ corresponds to (N×N) channel matrix from a $k^{th}$ transmitting end to a receiving end. The channel matrix is a diagonal matrix and includes frequency axis channel coefficients. $c^{(k)}$ corresponds to (N×1) UE-specific spreading code vector from the $k^{th}$ transmitting end to the receiving end. $s_k$ corresponds to a data symbol to a $k^{th}$ receiving end and n corresponds to (N×1) signal noise vector. K corresponds to the number of multiple users allocated to the same time-frequency resource. In this case, $$\left[ \frac{[A]_j}{[B]_{j,j}} \right]_{j=1,\ldots,N}$$

denotes the division between $j^{th}$ element of A vector and $j^{th}$ diagonal element of B matrix. When the A vector corresponds to a diagonal matrix, it means element division between diagonal matrixes.

In equation 5, signals of desired codewords and noise are left only via channel compensation. And, as shown in equation 6, detection is performed via a conjugate codeword of a UE-specific spreading code of a receiving end.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} \cdot s_n + \tilde{n}_k.$$

In equation 6, the second term of the last row corresponds to MUI and the MUI can be cancelled or reduced via a MUD scheme.

In uplink, a detection equation for decoding data in a receiving end of a base station can be expressed as equation 7 described in the following.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the equation 7 corresponds to a multi-user interference signal MUI by a data symbol to a different receiving end. A detection equation of a receiving end for decoding data of a $k^{th}$ user can be expressed as equation 8 described in the following.

$$\hat{y}_k = \quad \text{[Equation 8]}$$

$$\left[ \frac{[y]_j}{[H_k]_{j,j}} \right]_{j=1,\ldots,N} = c^{(k)} s_k + \sum_{n=1}^{K} \left[ \frac{[H_n]_{j,j}}{[H_k]_{j,j}} \right]_{j=1,\ldots,N} c^{(n)} s_n + \hat{n},$$

Signals of desired codewords, MUI, and noise are left only through channel compensation for data of a $k^{th}$ user. And, as shown in equation 9, detection is performed via a conjugate codeword of a UE-specific spreading code of a receiving end.

$$\tilde{y}_k = c^{(k)*} \cdot \hat{y}_k \quad \text{[Equation 9]}$$

$$= c^{(k)*} \cdot c^{(k)} s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} s_n + \tilde{n},$$

$$= s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} \cdot s_n + \tilde{n}.$$

In equation 9, the second term of the last row corresponds to MUI and the MUI can be cancelled or reduced via a MUD scheme. In this case, a channel change amount of a frequency axis of $$\left[ \frac{[H_n]_{j,j}}{[H_k]_{j,j}} \right]_{j=1,\ldots,N}$$

may bring about a change of reception capability between UE-specific spreading codes due to a channel environment difference from multiple users. In the foregoing description, for clarity, it has been explained as the number of Tx/Rx antennas corresponds to 1. However, it is apparent that the same scheme is also applied to environment using multiple antennas.

Among the aforementioned NOMA techniques, a non-orthogonal codebook based type (e.g., SCMA, CDMA, etc.) transmits a plurality of symbols through superposition using a spreading scheme. There exists a trade-off relationship between interference due to superposition and the increase of a data transfer rate due to the superposition according to a level of superposition between spreading symbols and a configuration of a non-orthogonal codebook. In this case, the interference due to the superposition can be classified into inter-symbol interference (ISI) of a single user and inter-user interference (IUI) and may bring about the decrease of a block error rate (BLER). In particular, it is necessary to perform superposition scheduling and signaling based on required traffic and an interference level. The present invention proposes a method of performing superposition scheduling and signaling based on traffic of a next generation 5G system and interference due to superposition. In particular, the present invention proposes a method of efficiently managing NOMA schemes utilizing a non-orthogonal codebook according to traffic or superposition scheduling.

Embodiment 1: Method of Managing an Orthogonal Subset of a Non-Orthogonal Codebook It is necessary to develop a management scheme for a case that the entire superposition level of a non-orthogonal codebook is not used according to traffic of a single user or multiple users.

A transmitting end and a receiving end assign a UE-specific spreading code to each user using a predefined non-orthogonal codebook. The UE-specific spreading code can be expressed as equation 10 described in the following.

$$C = [c^{(1)} \ldots c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 10]}$$

In equation 10, N corresponds to a spreading factor, K corresponds to a superposition factor, and there is an overloading factor of K/N. A UE-specific spreading code is defined by a non-orthogonal codebook and includes an orthogonal subset. In this case, non-orthogonality and orthogonality coexist in a single codebook. In this case, it is able to reduce an amount of information, which is exchanged between a transmitting end and a receiving end to promise a codebook.

In particular, a codebook satisfies $C \subset \mathbb{C}^{N \times K}$ and an orthogonal subset OC satisfies $OC \subset C$. Then, the orthogonal subset OC has characteristics described in equation 11 in the following.

$$\begin{cases} |c^{(k)*} \cdot c^{(k)}| = 1, \forall k, k = 1, \ldots, O, \\ |c^{(k)*} \cdot c^{(j)}| = 0, \forall k, \forall j, k \neq j, k = 1, \ldots, O, j = 1, \ldots, O, \end{cases} \quad \text{[Equation 11]}$$

In equation 11, $c^{(k)*}$ corresponds to a conjugate codeword of $C^{(k)}$.

In equation 11, (1) the multiplication of a codeword same in both a transmitting end and a receiving end corresponds to 1. And, (2) a codeword of its own and a different codeword are orthogonal to each other within an orthogonal subset of the same codebook.

And, a complementary set $OC^c$ of the orthogonal subset satisfies $OC^c \subset C$. Then, the complementary set $OC^c$ of the orthogonal subset has characteristics described in the following.

$$\begin{cases} |c^{(k)*} \cdot c^{(k)}| = 1, \forall k, k = 1, \ldots, K - O, \\ |c^{(k)*} \cdot c^{(j)}| = \delta_{kj}, \forall k, \forall j, k \neq j, k = 1, \ldots, K - O, j = 1, \ldots, K - O, \end{cases} \quad \text{[Equation 12]}$$

In equation 12, (1) the multiplication of a codeword same in both a transmitting end and a receiving end corresponds to 1. And, (2) a codeword of its own and a different codeword are not orthogonal to each other within a complementary set of an orthogonal subset of the same codebook.

In this case, the complementary set $OC^c$ of the orthogonal subset does not always include non-orthogonal characteristic. For example, an orthogonal condition can be established between partial codewords of the complementary set $OC^c$ of the orthogonal subset. And, an orthogonal condition can also be established between a codeword of the $OC^c$ and a codeword of an orthogonal subset OC.

In the aforementioned scheme, it may not use all orthogonal codewords depending on required traffic or a level of interference. For example, when a superposition factor K is not fully used due to a change of a traffic amount or a change of an interference amount according to a change of channel environment, it may be able to adaptively utilize a NOMA or OMA operation in a given resource. By doing so, it may be able to control ISI or IUI by adaptively controlling an overloading factor and select a subset of a codebook within a range satisfying a target BLER.

It is able to define a subset of a codebook based on an overloading factor. When the overloading factor is equal to or less than 1, a transmitting end can select an orthogonal subset. When the overloading factor is greater than 1, the transmitting end can select a non-orthogonal subset. The transmitting end can select a subset of a codebook based on a superposition level.

Figure 8:
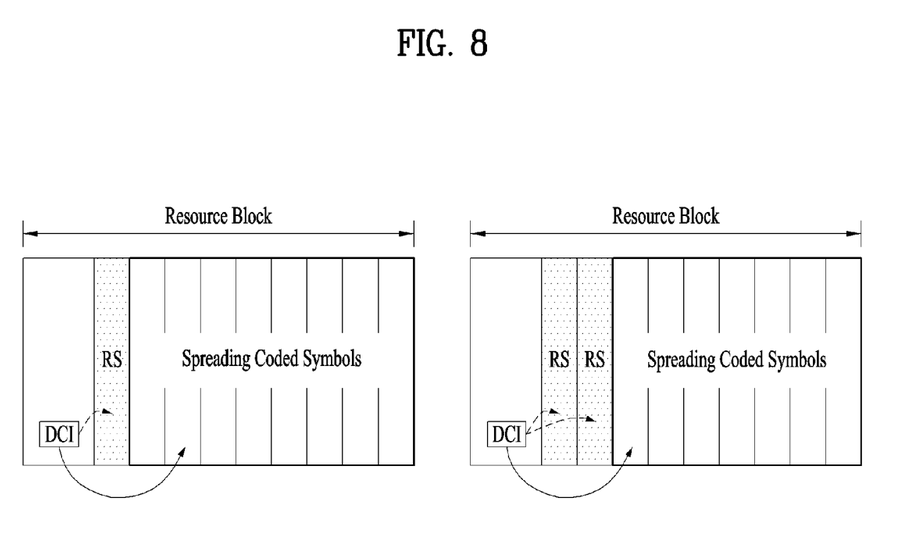
FIG. 8 is a diagram illustrating a change of a reference symbol or a reference signal changed by a codebook subset index.

FIG. 8 is a diagram illustrating a change of a reference symbol or a reference signal changed by a codebook subset index.

As mentioned in the foregoing description, a transmitting end selects a subset of a codebook and can transmit an index of the subset of the codebook as control information (e.g., downlink control information (DCI) format illustrated in FIG. 8). The control information including the codebook subset index information can include codeword allocation information on a single user or multiple users.

When the overloading factor does not exceed 1 by the codebook subset or the number of single user or multiple users is less than N, as shown in the left drawing of FIG. 8, a DCI format can indicate a user equipment to detect a channel corresponding to a codeword based on a reference symbol, a reference signal (RS), or a reference pattern. On the contrary, when the overloading factor exceeds 1 and the number of multiple users is greater than N, as shown in the right drawing of FIG. 8, the DCI format can indicate the user equipment to detect a channel corresponding to a codeword based on multiple RSs or multiple reference patterns. And, the DCI format can explicitly inform the user equipment of the number of symbols of an RS or an RS pattern to be channel estimated by the user equipment to receive a data symbol according to a multi-user superposition access scheme. Or, when the number of symbols of an RS or an RS pattern to be channel estimated by the user equipment is defined in advance according to a codebook subset index, if the user equipment knows the codebook subset index, the user equipment is able to know the number of symbols of the RS or the RS pattern to be channel estimated by the user equipment.

For example, operations described in the following can be performed by selecting a codebook subset.

(1) When a subset index of a subset consisting of A number of codewords of which an overloading factor does not exceed 1 is transmitted, if a single user receives a symbol corresponding to all codewords, a receiving end (e.g., user equipment) performs channel detection via an RS and detects a desired symbol via a UE-specific spreading code without a MUD operation.

(2) When a subset index of a subset consisting of B number of codewords of which an overloading factor exceeds 1 is transmitted, if a single user receives a symbol corresponding to all codewords, a receiving end performs channel detection via an RS and detects a desired symbol by performing a MUD operation (in case of a single user, interference cancellation (e.g., SIC, PIC, etc.)).

(3) When a subset index of a subset consisting of A number of codewords of which an overloading factor does not exceed 1 is transmitted, if C number of users not exceeding N receive a symbol corresponding to A number of codewords, a receiving end performs channel detection via C number of RSs and detects a desired symbol via a UE-specific spreading code without a MUD operation.

(4) When a subset index of a subset consisting of B number of codewords of which an overloading factor exceeds 1 is transmitted, if C number of users not exceeding N receive a symbol corresponding to all codewords, a receiving end performs channel detection via C number of RSs and detects a desired symbol by performing a MUD operation.

(5) When a subset index of a subset consisting of B number of codewords of which an overloading factor exceeds 1 is transmitted, if D number of users exceeding N receive a symbol corresponding to B number of codewords, a receiving end performs channel detection via D number of RSs and detects a desired symbol via a UE-specific spreading code without a MUD operation.

Since RSs are distinguished from each other using the maximum N number of orthogonal sequences and the C number of RSs does not exceed N, the C number of RSs can be defines by a single RS or a reference pattern. For example, since RSs are distinguished from each other using the maximum N number of orthogonal sequences, as shown in the left drawing of FIG. 8, it is able to perform channel estimation by allocating a single RS by overlapping the C number of RSs with an orthogonal sequence. And, since D number of RSs exceeds N, it is unable to define the D number of RSs by a single RS or reference pattern. For example, since RSs are distinguished from each other using the maximum N number of orthogonal sequences, as shown in the right drawing of FIG. 8, it is necessary to allocate an additional RS for D-N number of RSs. Or, since the D number of RSs exceeds N, RSs can be distinguished from each other using D number of non-orthogonal sequences. In this case, since it is unable to guarantee orthogonality between RSs, channel estimation performance is deteriorated. In the aforementioned methods, a pattern of an RS, a superposition scheme, an arrangement scheme can be configured in various ways.

In order to operate the aforementioned method, (1) a receiving end (e.g., user equipment) feedbacks a CQI report and/or a buffer state report (BSR) to a transmitting end (e.g., base station) through uplink control information. (2) The base station selects an optimized codebook subset from (1) based on a traffic amount and an interference amount. When the codebook subset is selected, it may or may not consider the uplink control information received from (1). (3) The base station transmits a codebook subset index to the user equipment via control information (e.g., DCI format), configures the number of RSs or an RS pattern based on a selected codebook subset index, and transmits data symbols through superposition based on the codebook subset index. (4) The user equipment performs channel estimation on the RSs or the RS pattern based on the codebook subset index. (5) The user equipment equalizes overlapped data symbols based on an estimated channel and detects a desired symbol by performing interference cancellation or multi-user detection based on the codebook subset index. In this case, if an overloading factor is equal to or less than 1 based on the codebook subset index, a MUD block of the user equipment does not operate and a desired symbol is detected through a UE-specific spreading code only. On the contrary, if the overloading factor is greater than 1 based on the codebook subset index, a desired symbol is detected by operating an MUD block of a receiving end.

Data of a single user can be transmitted through superposition via a single subset by exchanging information between a single user or a single UE and a base station. Data of multiple users can be transmitted through superposition by distributing codewords within a subset via information exchanged between multiple users and a base station.

Although the method above has been explained in the aspect of downlink, the method can be identically applied in the aspect of uplink by transmitting a codebook subset index or a codebook codeword index using a DCI format via scheduling of a base station.

Embodiment 2: Example of Managing an Orthogonal Subset of a Non-Orthogonal Codebook As an example of an orthogonal subset of a non-orthogonal codebook, when a spreading factor N corresponds to 4 and a superposition factor K corresponds to 15, the orthogonal subset of the non-orthogonal codeword is illustrated in Equation 13 in the following.

$$C = [\,c^{(1)} \; \ldots \; c^{(15)}\,] = \begin{bmatrix} c_1^{(1)} & \ldots & c_1^{(15)} \\ \vdots & \ddots & \vdots \\ c_4^{(1)} & \ldots & c_4^{(15)} \end{bmatrix} = \quad \text{[Equation 13]}$$

$$\begin{bmatrix} 1 & 1 & 1 & 1 & 0 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 0 & 1 & 1 & 0 & 1 & 0 & 1 & 0 & 1 & 0 & 0 & 1 & 0 \\ 1 & 0 & 1 & 1 & 1 & 0 & 0 & 1 & 0 & 1 & 1 & 0 & 0 & 0 & 1 \end{bmatrix}$$

As illustrated in equations 14 to 18, it is able to distinguish a subset for a codebook based on a change of required traffic or a change of an interference amount according to a channel change.

Subset 1(K = 4): [Equation 14]

$$OC = [\,c^{(12)} \; \ldots \; c^{(15)}\,] = \begin{bmatrix} c_1^{(12)} & \ldots & c_1^{(15)} \\ \vdots & \ddots & \vdots \\ c_4^{(12)} & \ldots & c_4^{(15)} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Subset 2(K = 6): $NC\,1 = [\,c^{(6)} \; c^{(11)} \; \ldots \; c^{(15)}\,] =$ [Equation 15]

$$\begin{bmatrix} c_1^{(6)} & c_1^{(11)} & \ldots & c_1^{(15)} \\ \vdots & \vdots & \ddots & \vdots \\ c_4^{(6)} & c_4^{(11)} & \ldots & c_4^{(15)} \end{bmatrix} = \begin{bmatrix} 1 & 0 & 1 & 0 & 0 & 0 \\ 1 & 0 & 0 & 1 & 0 & 0 \\ 0 & 1 & 0 & 0 & 1 & 0 \\ 0 & 1 & 0 & 0 & 0 & 1 \end{bmatrix}$$

Subset 3(K = 8): $NC\,2 = [\,c^{(6)} \; c^{(7)} \; c^{(10)} \; \ldots \; c^{(15)}\,] =$ [Equation 16]

$$\begin{bmatrix} c_1^{(6)} & c_1^{(7)} & c_1^{(10)} & \ldots & c_1^{(15)} \\ \vdots & \vdots & \vdots & \ddots & \vdots \\ c_4^{(6)} & c_4^{(7)} & c_4^{(10)} & \ldots & c_4^{(15)} \end{bmatrix} =$$

$$\begin{bmatrix} 1 & 1 & 0 & 0 & 1 & 0 & 0 & 0 \\ 1 & 0 & 1 & 0 & 0 & 1 & 0 & 0 \\ 0 & 1 & 0 & 1 & 0 & 0 & 1 & 0 \\ 0 & 0 & 1 & 1 & 0 & 0 & 0 & 1 \end{bmatrix}$$

Subset 4(K = 10): $NC\,3 = [\,c^{(6)} \; \ldots \; c^{(15)}\,] =$ [Equation 17]

$$\begin{bmatrix} c_1^{(6)} & \ldots & c_1^{(15)} \\ \vdots & \ddots & \vdots \\ c_4^{(6)} & \ldots & c_4^{(15)} \end{bmatrix} = \begin{bmatrix} 1 & 1 & 1 & 0 & 0 & 0 & 1 & 0 & 0 & 0 \\ 1 & 0 & 0 & 1 & 1 & 0 & 0 & 1 & 0 & 0 \\ 0 & 1 & 0 & 1 & 0 & 1 & 0 & 0 & 1 & 0 \\ 0 & 0 & 1 & 0 & 1 & 1 & 0 & 0 & 0 & 1 \end{bmatrix}$$

Subset 5(K = 14): $NC\,4 =$ [Equation 18]

$$[\,c^{(2)} \; \ldots \; c^{(15)}\,] = \begin{bmatrix} c_1^{(2)} & \ldots & c_1^{(15)} \\ \vdots & \ddots & \vdots \\ c_4^{(2)} & \ldots & c_4^{(15)} \end{bmatrix} =$$

$$\begin{bmatrix} 1 & 1 & 1 & 0 & 1 & 1 & 1 & 0 & 0 & 0 & 1 & 0 & 0 & 0 \\ 1 & 1 & 0 & 1 & 1 & 0 & 0 & 1 & 1 & 0 & 0 & 1 & 0 & 0 \\ 1 & 0 & 1 & 1 & 0 & 1 & 0 & 1 & 0 & 1 & 0 & 0 & 1 & 0 \\ 0 & 1 & 1 & 1 & 0 & 0 & 1 & 0 & 1 & 1 & 0 & 0 & 0 & 1 \end{bmatrix}$$

The subset 1 illustrated in equation 14 corresponds to an orthogonal subset of which a spreading factor corresponds to 4 and a superposition factor corresponds to 4. The subset 1 has an overloading factor of 1 and is configured without superposition in the aspect of an element. On the contrary, a subset 2 illustrated in equation 15 has a superposition factor of 6 and an overloading factor of 6/4. The subset 2 has a superposition level of 2 times in the aspect of an element. A subset 3 illustrated in equation 16 has a superposition factor of 8 and an overloading factor of 8/4=2. The subset 3 has a superposition level of 3 times in the aspect of an element. A subset 4 illustrated in equation 17 has a superposition factor of 10 and an overloading factor of 10/4=2.5. The subset 4 has a superposition level of 4 times in the aspect of an element. A subset 5 illustrated in equation 18 has a superposition factor of 14 and an overloading factor of 14/4. The subset 5 has a superposition level of 5 times in the aspect of an element. In case of using the entire codebook of which a superposition factor K corresponds to 15, an overloading factor of the codebook corresponds to 15/4 and the codebook has a superposition level of 6 times in the aspect of an element. An embodiment for the codebook subset is described in the following in a form of 3GPP TS 36.211.

TABLE 1

| Subset Index | Spreading Factor (N) | Superposition Factor (K) | Generalizations | Codewords |
|---|---|---|---|---|
| 0 | 4 | 15 | $[c^{(1)} \ldots c^{(15)}]$ | $\begin{bmatrix} 1 & 1 & 1 & 1 & 0 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 0 & 1 & 1 & 0 & 1 & 0 & 1 & 0 & 1 & 0 & 0 & 1 & 0 \\ 1 & 0 & 1 & 1 & 1 & 0 & 0 & 1 & 0 & 1 & 1 & 0 & 0 & 0 & 1 \end{bmatrix}$ |
| 1 | 4 | 4 | $[c^{(12)} \ldots c^{(15)}]$ | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 2 | 4 | 6 | $[c^{(6)} \; c^{(11)} \ldots c^{(15)}]$ | $\begin{bmatrix} 1 & 0 & 1 & 0 & 0 & 0 \\ 1 & 0 & 0 & 1 & 0 & 0 \\ 0 & 1 & 0 & 0 & 1 & 0 \\ 0 & 1 & 0 & 0 & 0 & 1 \end{bmatrix}$ |
| 3 | 4 | 8 | $[c^{(6)} \; c^{(7)} \; c^{(10)} \ldots c^{(15)}]$ | $\begin{bmatrix} 1 & 1 & 0 & 0 & 1 & 0 & 0 & 0 \\ 1 & 0 & 1 & 0 & 0 & 1 & 0 & 0 \\ 0 & 1 & 0 & 1 & 0 & 0 & 1 & 0 \\ 0 & 0 & 1 & 1 & 0 & 0 & 0 & 1 \end{bmatrix}$ |
| 4 | 4 | 10 | $[c^{(6)} \ldots c^{(15)}]$ | $\begin{bmatrix} 1 & 1 & 1 & 0 & 0 & 0 & 1 & 0 & 0 & 0 \\ 1 & 0 & 0 & 1 & 1 & 0 & 0 & 1 & 0 & 0 \\ 0 & 1 & 0 & 1 & 0 & 1 & 0 & 0 & 1 & 0 \\ 0 & 0 & 1 & 0 & 1 & 1 & 0 & 0 & 0 & 1 \end{bmatrix}$ |
| 5 | 4 | 14 | $[c^{(2)} \ldots c^{(15)}]$ | $\begin{bmatrix} 1 & 1 & 1 & 0 & 1 & 1 & 1 & 0 & 0 & 0 & 1 & 0 & 0 & 0 \\ 1 & 1 & 0 & 1 & 1 & 0 & 0 & 1 & 1 & 0 & 0 & 1 & 0 & 0 \\ 1 & 0 & 1 & 1 & 0 & 1 & 0 & 1 & 0 & 1 & 0 & 0 & 1 & 0 \\ 0 & 1 & 1 & 1 & 0 & 0 & 1 & 0 & 1 & 1 & 0 & 0 & 0 & 1 \end{bmatrix}$ |

As traffic required through the subsets is getting higher, a higher overloading factor is used and a channel state is getting worse, a lower superposition factor is used to select a subset. As a superposition level is getting higher, interference cancellation or MUD having better performance is required. It is necessary to select an optimized codebook subset in consideration of the abovementioned characteristics.

For clarity, the examples shown in Table 1 have been explained on the basis of a binary codebook. However, the examples can be identically applied to an orthogonal/non-orthogonal codebook based on a complex coefficient. In this case, a superposition level based on the binary codebook may differ from superposition level based on a complex coefficient based codebook.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of detecting data, which is transmitted by a user equipment based on a multi-user superposition transmission scheme, can be industrially applied to various wireless communication systems including 3GPP LTE-A, 5G system, and the like.

What is claimed is:
1. A method of detecting transmitted data by a user equipment (UE) according to a multiuser superposition transmission scheme, the method comprising:
receiving downlink control information containing information regarding a codebook subset selected from a non-orthogonal codebook containing an orthogonal subset and a non-orthogonal subset, from a base station;

receiving superposed data symbols related to the selected codebook subset;

performing channel estimation based on a reference signal symbol or a reference signal pattern corresponding to the selected codebook subset; and detecting desired data symbols based on the selected codebook subset and the channel estimation, wherein the superposed data symbols correspond to symbols containing data for the UE for at least one other UE.

2. The method of claim 1, wherein the information regarding the selected codebook subset includes a codebook subset index corresponding to the selected codebook subset.

3. The method of claim 1, wherein when the selected codebook subset is configured by codewords for which an overloading factor is equal to or less than 1, the desired data symbols are detected based on an interference cancellation scheme performed on the superposed data symbols and wherein the overloading factor corresponds to a superposition factor/spreading factor.

4. The method of claim 3, wherein the interference cancellation scheme corresponds to a scheme for cancelling interference between the multiusers.

5. The method of claim 1, wherein when the selected codebook subset is configured by codewords for which an overloading factor is greater than 1, the desired data symbols are detected based on a multiuser detection scheme performed on the superposed data symbols and wherein the overloading factor corresponds to a superposition factor/spreading factor.

6. The method of claim 1, further comprising:

equalizing the superposed data symbols which are received based on the channel estimation, wherein the desired data symbols are detected based on the selected codebook subset for the equalized superposed data symbols.

7. The method of claim 1, wherein the desired data symbols are detected based on a UE-specific spreading code allocated to the UE.

8. The method of claim 1, wherein the selected codebook subset is selected based on a downlink traffic amount or an interference amount.

9. A user equipment (UE) for detecting a transmitted data according to a multiuser superposition transmission scheme, the UE comprising:

a receiver configured to receive downlink control information containing information regarding a codebook subset selected from a non-orthogonal codebook containing an orthogonal subset and a non-orthogonal subset, from a base station, and receive superposed data symbols related to the selected codebook subset; and a processor configured to perform channel estimation based on a reference signal symbol or reference signal pattern corresponding to the selected codebook subset, and to detect desired data symbols based on the selected codebook subset and the channel estimation, wherein the superposed data symbols correspond to symbols containing data for the UE for at least one other UE.

10. The UE of claim 9, wherein when the selected codebook subset is configured by codewords for which an overloading factor is equal to or less than 1, the processor is configured to detect the desired data symbols based on an interference cancellation scheme performed on the superposed data symbols and wherein the overloading factor corresponds to a superposition factor/spreading factor.

11. The UE of claim 9, wherein when the selected codebook subset is configured by codewords for which an overloading factor is greater than 1, the processor is configured to detect the desired data symbols based on a multiuser detection scheme performed on the superposed data symbols and wherein the overloading factor corresponds to a superposition factor/spreading factor.

12. The UE of claim 9, wherein the processor is further configured to equalize the superposed data symbols, which are received based on the channel estimation, and detect the desired data symbols based on the selected codebook subset for the equalized superposed data symbols.

13. The UE of claim 9, wherein the processor is further configured to detect the desired data symbols based on a UE-specific spreading code allocated to the UE.

14. The UE of claim 9, wherein the selected codebook subset is selected based on a downlink traffic amount or an interference amount.

* * * * *